Patented June 1, 1926.

1,586,947

UNITED STATES PATENT OFFICE.

JOHN H. CAUGHLAN, OF OAKLAND, CALIFORNIA.

PRINTING INK.

No Drawing.   Application filed June 18, 1923.  Serial No. 646,237.

My invention has for its object a highly efficient and superior black printing ink. The ink of my invention is characterized by having a base of air blown asphalt with which I mix a proportion of carbon black and also of linoleate of lead and also a suitable binder, and I have found a binder composed of liquid asphaltum and petroleum oil to be particularly well adapted to this use. The air blown asphaltum which I employ is produced by blowing air through hot crude oil or asphaltum and I have found that the following proportions give an excellent ink: 23 parts of air blown asphaltum; 8 parts of linoleate of lead; 17 parts of carbon black and 52 parts of a binder which binder may advantageously be composed of 41 parts of petroleum oil and 11 parts of liquid asphaltum. The petroleum oil which I employ is a non-viscous oil comparable with the light lubricating oils and is non-drying. The liquid asphaltum has the advantage of preventing the separation of the petroleum oil and the air blown asphaltum. My ink has the advantage of remaining on the surface; that is, it does not penetrate beyond that necessary to hold the ink on the printed page. It is beautifully black, exceptionally permanent and dries promptly. The linoleate of lead is the ingredient employed for the drying and the quantity of this may be varied from the proportions above given to suit individual cases. Also the proportions of petroleum oil and liquid asphaltum may be somewhat varied to suit the variations in these articles ordinarily found in commerce.

The drying occurs by the petroleum oil or non-drying ingredient being absorbed by the paper fibre leaving the asphalt and dryer material on the surface of the paper.

The asphalt and dryer material however adheres to the paper by its penetrating the fibre sufficiently to hold thereto.

In this way the non-drying ingredient due to its separation from the other constituents, when applied to the paper, enables them to dry sufficiently, rapidly and firmly. The air blown asphalt imparts the quality of holding the pigment on the paper surface, although the petroleum oil is absorbed therefrom and into the paper fibre.

I claim:—

1. A printing ink composed substantially of 23 parts of airblown asphalt, 8 parts linoleate of lead, 17 parts carbon black and 52 parts of a binder including a constituent of liquid asphalt.

2. A printing ink composed substantially of 23 parts of airblown asphalt, 8 parts linoleate of lead, 17 parts carbon black and 52 parts of a binder composed of substantially 41 parts petroleum oil and 11 parts liquid asphalt.

JOHN H. CAUGHLAN.